(12) United States Patent

McCormack

(10) Patent No.: US 6,224,125 B1
(45) Date of Patent: May 1, 2001

(54) TRAILER TOP RAIL ASSEMBLY WITH SUPPORT BRACE AND AWNING MOUNT

(75) Inventor: Robert B. McCormack, Duncan, OK (US)

(73) Assignee: Sooner Trailer Manufacturing Co., Duncan, OK (US)

( * ) Notice: Subject to any disclaimer, the term of this patent is extended or adjusted under 35 U.S.C. 154(b) by 0 days.

(21) Appl. No.: 09/337,923

(22) Filed: Jun. 22, 1999

(51) Int. Cl.[7] .......................... B62D 25/06; E04H 15/08; E04F 10/00; E04B 1/00
(52) U.S. Cl. ..................... 296/24.2; 296/181; 296/210; 160/46; 135/88.01; 52/56
(58) Field of Search .................... 296/24.2, 181, 296/210; 160/46, 67; 135/88.01, 88.07; 52/63, 222, 220.1, 273, 284, 56

(56) References Cited

U.S. PATENT DOCUMENTS

| | | | |
|---|---|---|---|
| Re. 25,914 | * 11/1965 | Richter et al. | 296/181 |
| 2,191,264 | 2/1940 | Werner . | |
| 2,225,170 | * 12/1940 | Gilpin | 52/56 |
| 3,326,599 | * 6/1967 | Pashenee | 296/210 |
| 3,440,790 | * 4/1969 | Nerem | 52/273 |
| 4,018,480 | * 4/1977 | Stone | 296/181 |
| 4,036,522 | * 7/1977 | DeRees et al. | 296/210 |
| 4,192,112 | * 3/1980 | Reilly, Sr. | 52/222 |
| 4,444,123 | * 4/1984 | Smith et al. | 52/56 |
| 4,768,317 | * 9/1988 | Markham | 52/74 |
| 4,828,316 | * 5/1989 | Bennett et al. | 296/181 |
| 4,909,296 | * 3/1990 | Sellke et al. | 160/67 |
| 4,986,596 | 1/1991 | Gohier . | |
| 5,002,111 | * 3/1991 | Boiteau | 160/67 |
| 5,041,318 | * 8/1991 | Hulls | 296/181 |
| 5,172,743 | * 12/1992 | Wallace et al. | 160/67 |
| 5,218,792 | * 6/1993 | Cooper | 296/210 |
| 5,472,290 | * 12/1995 | Hulls | 296/181 |
| 5,934,739 | * 8/1999 | Waldeck | 296/210 |
| 5,934,741 | * 8/1999 | Beukers et al. | 296/181 |
| 5,971,460 | * 10/1999 | Enning | 296/210 |
| 6,006,809 | * 12/1999 | Williams et al. | 160/46 |
| 6,022,067 | * 2/2000 | Hargett et al. | 296/181 |

\* cited by examiner

*Primary Examiner*—D. Glenn Dayoan
*Assistant Examiner*—Hilary Gutman
(74) *Attorney, Agent, or Firm*—Hovey, Williams, Timmons & Collins

(57) ABSTRACT

A top rail assembly (20) utilizes a support brace (22) and an awning mount groove (26) recessed in a rail body (24) to provide a strong top rail assembly (20) without using undue space or degrading aesthetics. The brace (22) extends between a side wall brace tab (72) and a roof brace tab (64) to reinforce the top rail body (24) and define a wire chase opening (76) between the brace (22) and a transition section (74) of the body (24). The groove (26) is recessed into the rail body (24) and is defined by two opposed legs (80, 82) and a bottom segment (84) which are integral to the rail body (24).

8 Claims, 1 Drawing Sheet

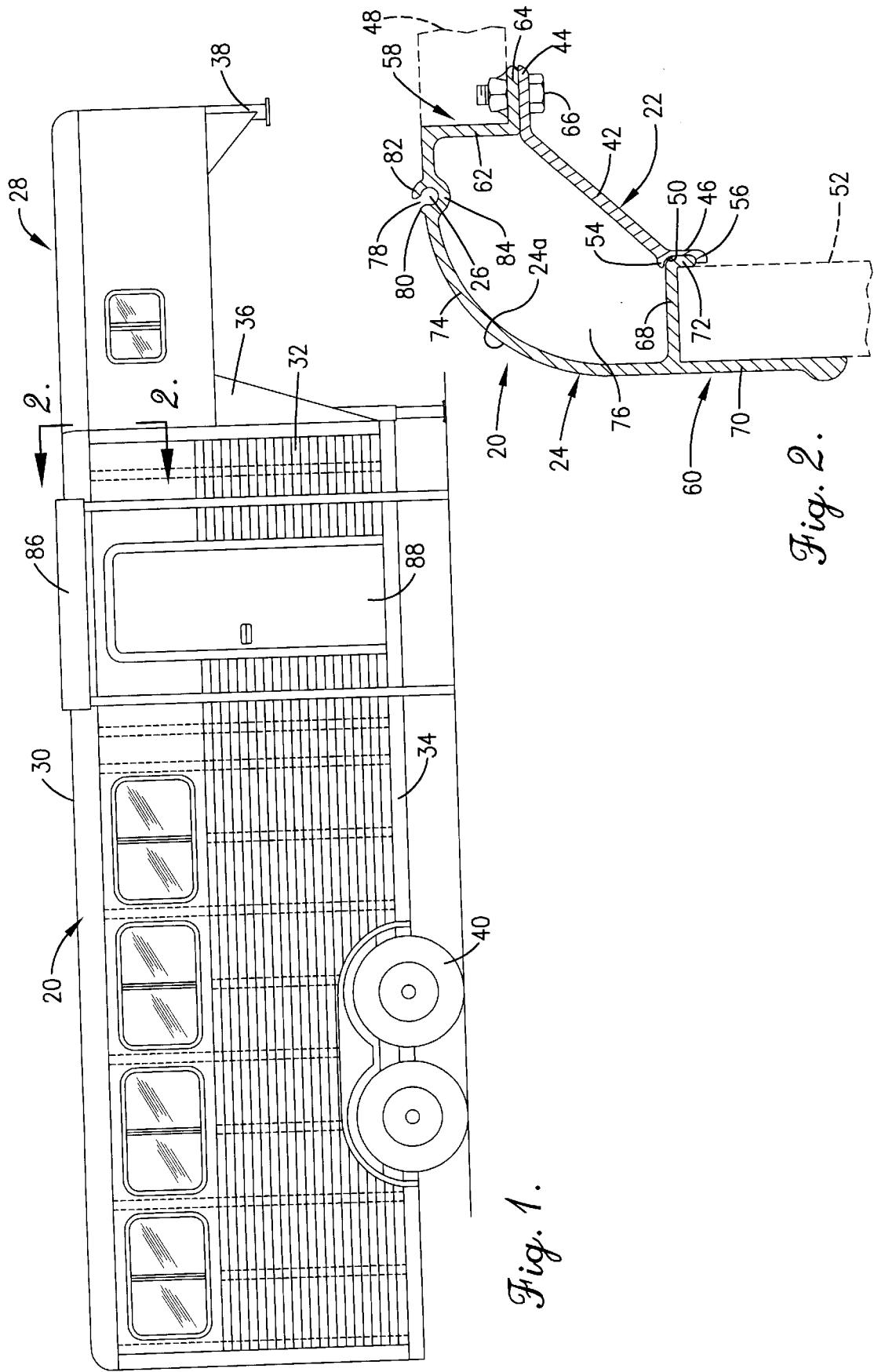

TRAILER TOP RAIL ASSEMBLY WITH SUPPORT BRACE AND AWNING MOUNT

TECHNICAL FIELD

This invention relates to trailers and, more particularly, to trailer and top rail components used in the construction of trailers.

BACKGROUND

High strength is a desirable characteristic in trailers, but the desire for strength typically competes with the needs for space and aesthetically pleasing construction. An important area of the trailer is the top perimeter corner which is formed by a top rail. Though successfully increasing strength, previous endeavors to strengthen top rails have sacrificed space and/or aesthetics.

Another aesthetic and functional concern, for trailers and the top rails in particular, is how awnings are mounted on the top rails. Presently, awnings are removably mounted on trailers by mounting strips. The mounting strips are fastened to the exterior surface of the trailers, usually the top rails, with conventional fasteners such as nuts and bolts. Thus, the mounting strips are raised significantly above the exterior surfaces of the trailers and the heads of the fasteners are typically exposed thereby detracting from the aesthetic value of the trailers. Further, the fasteners compromise the integrity of the top rails reducing strength and providing a pathway for water entry.

SUMMARY OF THE INVENTION

Accordingly, one object of the present invention is to provide an improved top rail assembly providing increased strength without unacceptably sacrificing space and aesthetics.

It is another object of the present invention to provide an improved top rail assembly providing an aesthetically and functionally improved awning mount.

In carrying out the foregoing and other objects, the present invention contemplates an improved vehicle top rail assembly having a vehicle shell member with a substantially rigid body. The body defines an outer surface that has a recessed awning groove. The groove includes an open mouth for receiving an awning member.

In a preferred embodiment, the awning mount groove is cylindrical, and the open mouth is positioned above the outer surface and defined between a pair of opposed legs extending outwardly from the outer surface. The open mouth is preferably narrower than the largest dimension of the awning mount groove.

The present invention further contemplates a top rail assembly for joining a side wall and a roof of a vehicle, preferably a trailer. The top rail side wall and roof connections are for connecting to a side wall and a roof, respectively. A transition section extends between and joins the side wall and roof connections, and a support brace extends between a side wall brace tab and a roof brace tab of the side wall and roof connections, respectively.

In a preferred embodiment, the support brace includes a substantially flat roof foot which is removably attached to the roof brace tab by a fastener, so that the transition section and the support brace define a wire chase opening therebetween. The support brace also includes a side wall foot. The side wall foot defines a recess which receives the side wall brace tab therein.

The present invention also contemplates incorporating the top rail assembly into a vehicle, preferably a trailer having a roof, side walls, and a floor supported on a vehicle frame. The top rail assembly joins the side walls to the roof and provides an aesthetically pleasing awning mount groove, so that awnings can be mounted on the trailer when stationary.

BRIEF DESCRIPTION OF THE DRAWINGS

FIG. 1 is a side view of a trailer including a top rail according to the present invention; and FIG. 2 is a transverse cross-sectional view of the top rail taken along line 2—2 in FIG. 1.

DETAILED DESCRIPTION

Referring to the drawings in greater detail, the top rail assembly 20 shown in FIGS. 1 and 2 includes a support brace 22 and a rail body 24 defining an awning mount groove 26. The top rail assembly 20 is incorporated into a vehicle 28, preferably a trailer, to join a roof 30 with side walls 32 of the trailer 28.

The trailer 28 includes a floor 34, which along with the roof 30 and side walls 32, are supported on a trailer frame 36. The trailer also includes many conventional features such as a hitching mechanism 38 and a plurality of ground-engaging wheels 40. The wheels 40 are rotatably mounted on and support the trailer frame 36, and the hitching mechanism 38 is connected to the front of the trailer frame for coupling the trailer 28 with a towing vehicle. (not shown). These conventional features and others of the trailer 28 are described to the extent necessary for an understanding of the invention.

The support brace 22 is a substantially rigid and elongated interior structural member used to support and strengthen the rail body 24. The support brace has a substantially flat middle section 42, a roof foot 44, and a side wall foot 46. The roof foot 44 is substantially flat and extends from the middle section 42 at an angle of approximately 45°. The roof foot 44 is substantially parallel to a roof member 48 connected to the rail body 24. The side wall foot 46 extends from the middle section 42 at an angle of approximately 45° and defines a recess 50 opening toward a side wall member 52 connected to the rail body 24. The recess 50 is defined between an upper tang 54 and a lower tang 56 which extend toward the side wall member. The side wall foot is substantially parallel to the side wall member 52.

The rail body 24 is a unitary, substantially rigid, and elongated exterior shell member used to connect the roof members 48 to the side wall members 52. To that end, the body includes a roof connection 58 and a side wall connection 60. The roof connection 58 includes a roof end wall 62 and a roof brace tab 64. The roof members 48 nest in the roof connection 58 against the end wall 62 and on top of the roof brace tab 64. The roof brace tab 64 is preferably attached to the roof foot 44 of the support brace 22 by a weld. Alternatively as shown, fasteners 66 are used to removably connect the roof foot 44 to the roof brace tab 64. If desired, a portion of the fastener 66, such as the nut or head of the bolt, is welded to the top of the roof brace tab 64 to fix its location and permit easy removal and replacement of the support brace 22.

The side wall connection 60 includes an upper end wall 68, an outer retaining wall 70, and a side wall brace tab 72, which is shorter than the roof brace tab 64. The side wall members 52 are held between the outer retaining wall 70 and the side wall brace tab 72, and the ends of the side walls abut against the upper end wall 68 of the side wall connection 60. The side wall brace tab 72 is received in the recess 50 of the side wall foot 46, so that the upper tang 54 rests on top of the upper end wall 68 to secure the support brace 22 in place as it extends between the side wall tab and the roof tab. Though the support brace can be attached to both tabs 64, 72 or a selected one of the tabs, it is preferably connected to the side wall brace tab 64.

The side wall connection 60 and the roof connection 58 are preferably joined by a transition section 74 extending therebetween. The transition section 74 is preferably arcuate and defines the awning groove 26 therein. A wire chase opening 76 is defined between the transition section 74 and the middle section 42 of the brace 22. Wires and other components (not shown) are passed through the opening 76 thereby conserving space and achieving an aesthetically pleasing trailer interior. Because the brace 22 is removable, additional components can, from time to time, be easily run through the wire chase opening 76, and the components in the opening 76 are easily accessible for maintenance.

The awning mount groove 26 is defined in the transition section 74 of the body 24 and is substantially continuous extending through the length of the body. The groove 26 is preferably recessed into the body 24 and is substantially cylindrical having an upper open mouth 78. The mouth 78 is positioned above the outer surface 24a of the body and is defined between a pair of opposed legs 80, 82 extending outwardly from the body 24. The inner leg 82 is longer than the outer leg 80, so that the mouth 78 opens toward the side wall 32 of the trailer 28. Both of the legs are arcuate to make the groove cylindrical. The ends of the legs 80, 82 are spaced apart, so that the mouth is narrower than the largest dimension of the groove, that is, a diameter line. The base of the groove is defined by an inwardly extending bottom segment 84. The segment 84 is arcuate and extends into the wire chase opening 76. The legs 80, 82 and the bottom segment 84 are integrally formed with the body 24 eliminating the need for additional fasteners.

Because it is integral and recessed, the awning mount groove 26 is aerodynamic, aesthetically pleasing, and inconspicuous. Further, the integral feature of the groove does not provide a path for water entry into the trailer. The awning mount groove 26 allows an operator to removably attach an awning 86, over a door 88 for example, by inserting an awning member in the groove 26 when the trailer 28 is stationary.

Thus, a top rail assembly 20 is disclosed which utilizes a support brace 22 and an integrally provided awning mount groove 26 to provide a strengthened trailer structure with enhanced aesthetics and space utilization. Further, the top rail is not susceptible to water penetration.

Although preferred forms of the invention have been described above, it is to be recognized that such disclosure is by way of illustration only, and should not be utilized in a limiting sense in interpreting the scope of the present invention. Modifications to the exemplary embodiments, as herein above set forth, could be readily made by those skilled in the art without departing from the spirit of the appended claims.

The inventor hereby states the intent to rely on the doctrine of equivalents to determine and assess the reasonably fair scope of his invention as pertains to any apparatus or method not materially departing from but outside the literal scope of the invention as set out in the following claims.

I claim:

1. A top rail assembly for joining a side wall and a roof of a vehicle, said assembly comprising:
    a rail body including
        a side wall connection for connection to a sidewall member, the side wall connection including a side wall brace tab,
        a roof connection for connection to a roof member, the roof connection including a roof brace tab, and
        an arcuate transition section extending between and joining the side wall connection and the roof connection; and
    a support brace extending between the side wall brace tab and the roof brace tab to strengthen the rail body,
    said brace and said rail body cooperating to define a hollow opening therebetween,
    said brace serving as a cover over said opening and being detachably secured to said rail body to permit selective access to said opening.

2. The top rail assembly according to claim 1 further comprising a selectively releasable fastener attaching the support brace to the roof brace tab.

3. The top rail assembly according to claim 2 wherein the support brace includes a roof foot attached to the roof brace tab and a side wall foot having a recess receiving the side wall brace tab therein, said side wall foot and said side wall brace tab being devoid of fasteners therebetween.

4. The top rail assembly according to claim 3 wherein the roof foot and the roof brace tab are substantially flat.

5. A vehicle for transporting animals, equipment, people, and other desired items, the vehicle comprising:
    a floor;
    a roof above the floor;
    a plurality of side walls extending between the floor and the roof;
    a vehicle frame supporting the floor, roof, and side walls;
    a plurality of wheels rotatably mounted on the vehicle frame; and
    a plurality of elongated top rail assemblies joining the side walls and the roof, each top rail assembly including:
        a rail body including
            a side wall connection for connection to a sidewall member, the side wall connection including a side wall brace tab,
            a roof connection for connection to a roof member, the roof connection including a roof brace tab, and
            an arcuate transition section extending between and joining the side wall connection and the roof connection; and
        a support brace extending between the side wall brace tab and the roof brace tab to strengthen the rail body,
        said brace and said rail body cooperating to define a hollow opening therebetween,
        said brace serving as a cover over said opening and being detachably secured to said rail body to permit selective access to said opening.

6. The vehicle according to claim 5 further comprising a selectively releasable fastener attaching the support brace to the roof brace tab.

7. The vehicle according to claim 6 wherein the support brace includes a roof foot attached to the roof brace tab and a side wall foot having a recess receiving the side wall brace tab therein, said side wall foot and said side wall brace tab being devoid of fasteners therebetween.

8. The vehicle according to claims 5 wherein the transition section defines a recessed awning groove.

* * * * *